US012623440B2

(12) United States Patent
Tu et al.

(10) Patent No.: US 12,623,440 B2
(45) Date of Patent: May 12, 2026

(54) WINDSHIELD FOR VEHICLE AND METHOD FOR MANUFACTURING THE SAME

(71) Applicant: FUYAO GLASS INDUSTRY GROUP CO., LTD., Fuqing (CN)

(72) Inventors: Lele Tu, Fuqing (CN); Hui Wang, Fuqing (CN); Xianping Liu, Fuqing (CN); Jinliang Guan, Fuqing (CN); Feng Cai, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 580 days.

(21) Appl. No.: 18/120,089

(22) Filed: Mar. 10, 2023

(65) Prior Publication Data

US 2023/0211587 A1    Jul. 6, 2023

Related U.S. Application Data

(63) Continuation-in-part of application No. PCT/CN2021/127745, filed on Oct. 30, 2021.

(30) Foreign Application Priority Data

Sep. 21, 2020    (CN) .......................... 202010992758.3

(51) Int. Cl.
*B32B 17/10* (2006.01)
*B32B 7/02* (2019.01)
(Continued)

(52) U.S. Cl.
CPC .......... *B32B 17/10064* (2013.01); *B32B 7/02* (2013.01); *B32B 7/12* (2013.01);
(Continued)

(58) Field of Classification Search
CPC ........ B32B 17/10005; B32B 17/10009; B32B 17/10064; B32B 17/10165;
(Continued)

(56) References Cited

U.S. PATENT DOCUMENTS

2008/0206504 A1* 8/2008 Hayes ............... B32B 17/10247
156/182
2011/0052886 A1 3/2011 De Salins et al.
(Continued)

FOREIGN PATENT DOCUMENTS

CN 103502368 A 1/2014
CN 104507697 A 4/2015
(Continued)

OTHER PUBLICATIONS

International Search Report dated Jan. 19, 2022 issued in PCT/CN2021/127745.
(Continued)

*Primary Examiner* — Zachary M Davis
(74) *Attorney, Agent, or Firm* — Scully, Scott, Murphy & Presser, P.C.

(57) ABSTRACT

A windshield for a vehicle and a method for manufacturing the windshield are provided in the disclosure. The windshield includes an outer glass panel, an inner glass panel, and an intermediate adhesive layer. An opaque masking layer is disposed on at least one surface of the windshield. The opaque masking layer includes a dark ceramic-ink layer and an ultraviolet-drying ink layer. The dark ceramic-ink layer
(Continued)

has a first no-ink region, the ultraviolet-drying ink layer is located in the first no-ink region, the ultraviolet-drying ink layer has a light transmitting region. According to the disclosure, an optical quality of the light transmitting region can be ensured, a diopter of the light transmitting region is less than or equal to 200 mdpt.

15 Claims, 6 Drawing Sheets

(51) Int. Cl.

| | | |
|---|---|---|
| *B32B 7/12* | (2006.01) | |
| *B60J 1/02* | (2006.01) | |
| *B32B 27/30* | (2006.01) | |
| *B32B 27/36* | (2006.01) | |
| *B32B 27/40* | (2006.01) | |

(52) U.S. Cl.
CPC ........... *B60J 1/02* (2013.01); *B32B 17/10743* (2013.01); *B32B 17/10752* (2013.01); *B32B 17/1077* (2013.01); *B32B 17/10779* (2013.01); *B32B 17/10788* (2013.01); *B32B 27/304* (2013.01); *B32B 27/306* (2013.01); *B32B 27/308* (2013.01); *B32B 27/36* (2013.01); *B32B 27/365* (2013.01); *B32B 27/40* (2013.01); *B32B 2255/20* (2013.01); *B32B 2255/205* (2013.01); *B32B 2307/732* (2013.01); *B32B 2605/00* (2013.01)

(58) Field of Classification Search
CPC ........ B32B 17/10174; B32B 17/10247; B32B 17/10256; B32B 17/10266; B32B 17/10339; B32B 17/10348; B60J 1/00; B60J 1/001; B60J 1/02
See application file for complete search history.

(56) References Cited

U.S. PATENT DOCUMENTS

| | | | | |
|---|---|---|---|---|
| 2013/0258436 A1* | 10/2013 | Podbelski | .............. | C03C 17/32 |
| | | | | 359/893 |
| 2018/0257342 A1* | 9/2018 | Yano | ................. | B32B 17/10036 |
| 2019/0002338 A1* | 1/2019 | Furuhashi | .............. | C03C 17/04 |
| 2020/0391577 A1* | 12/2020 | Bard | ................. | B32B 17/10889 |
| 2021/0059022 A1* | 2/2021 | Sadakane | .............. | B32B 27/281 |

FOREIGN PATENT DOCUMENTS

| | | | |
|---|---|---|---|
| CN | 107001828 A | 8/2017 | |
| CN | 108137387 A | 6/2018 | |
| CN | 110114214 A | 8/2019 | |
| CN | 110382227 A | 10/2019 | |
| CN | 111372773 A | 7/2020 | |
| CN | 111372774 A | 7/2020 | |
| CN | 111386192 A | 7/2020 | |
| WO | 2017110782 A1 | 6/2017 | |
| WO | 2019064275 A2 | 4/2019 | |
| WO | 2019147605 A1 | 8/2019 | |
| WO | 2020115170 A1 | 6/2020 | |

OTHER PUBLICATIONS

First Chinese Office Action dated Mar. 23, 2021 issued in CN 202010992758.3.
Second Chinese Office Action dated Aug. 24, 2021 issued in CN 202010992758.3.

* cited by examiner

WINDSHIELD FOR VEHICLE AND METHOD FOR MANUFACTURING THE SAME

CROSS-REFERENCE TO RELATED APPLICATION(S)

This application is a continuation-in-part of International Application No. PCT/CN2021/127745, filed Oct. 30, 2021, which claims priority to Chinese Patent Application No. 202010992758.3, filed Sep. 21, 2020, the entire disclosures of which are hereby incorporated by reference.

TECHNICAL FIELD

This disclosure relates to the technology field of glass products, and particularly to vehicle glass configured to be mounted at an opening of a vehicle body. Specifically, this disclosure provides a windshield for a vehicle and a method for manufacturing the windshield.

BACKGROUND

With popularity of intelligent vehicle technologies such as assisted driving and autonomous driving, the number of cameras demanded has grown from only one to two, three or even more, and the requirement for image quality of cameras has also been enormously enhanced. For a front camera module (FCM) mounted on a windshield for a vehicle, a camera needs to obtain, through the windshield, a real-time view of the vehicle in a driving direction. Thus, for a light transmitting region of the windshield that allows the camera to observe an outside of the vehicle, requirements for visible light transmittance, diopter, radius of curvature, and the like become higher.

Generally, most windshields for vehicles are printed with black ceramic-ink in appearance to form black edges at peripheries of the windshields. There are two main functions. First, a black edge formed by printing ceramic ink can cover a rubber seal strip disposed at an edge of a windshield to block direct sunlight on the rubber seal strip, so as to protect the rubber seal strip from aging caused by prolonged radiation of ultraviolet in sunlight, thereby avoiding damage to the rubber seal strip. Second, the black edge can cover the rubber seal strip and various accessories on an inner surface of the windshield, ensuring an overall appearance aesthetics.

According to existing cameras, the diopter (the maximum optical distortion value allowed) of the light transmitting region of the windshield is required to be less than 400 milli-diopter (mdpt) for most vehicles, and not greater than 200 mdpt for some high-end vehicles. However, with continuous upgrade of vehicles in intelligence, automation, security, and the like, requirements for the quality, clarity, and accuracy of an image acquired by the camera are getting higher and higher, and the vehicle even is integrated with a sensor such as a laser radar, and thus, a diopter of a region corresponding to the camera is required to be not greater than 150 mdpt, even not greater than 100 mdpt. For a windshield mounted with a camera, the ceramic ink is printed to extend to a region where a camera support is mounted and to surround the light transmitting region, while no ceramic ink is printed in the light transmitting region. However, the windshield is manufactured through high-temperature heat treatment and bending process, such as heating to reach a temperature of greater than 600° C. A glass substrate is mainly heated by heat radiation of a heating element in a heating furnace. An absorption capacity of the ceramic ink to thermal radiation is remarkably different from an absorption capacity of the glass substrate to thermal radiation, especially the glass substrate is usually disposed with a transparent nano-film which is able to reflect thermal radiation, such as a transparent conductive film and an infrared reflecting film, and thus a temperature of a region printed with the ceramic ink is higher than a temperature of a region without ceramic ink, thereby causing a temperature gradient of tens of degrees Celsius between different parts of the glass substrate. As a result, the glass substrate has a dynamic difference in bending process, and therefore optical distortion or light distortion occurs around a border between the region printed with the ceramic ink and the region without the ceramic ink, and is relatively obvious within 30 mm from the border. In order to avoid image glow, image blurring, and other abnormalities caused by excessive natural light and stray light (e.g. stray light reflected from an instrument panel) entering an optical path system of the camera, a distance between a boundary of the ceramic ink and the light transmitting region is controlled to be relatively small, the diopter of the light transmitting region surrounded by the ceramic ink may be greater than 400 mdpt, causing the image obtained by the camera through the light transmitting region to fail to meet the requirements in quality, definition, and accuracy.

In order to solve a problem that the glass substrate has optical distortion or light distortion around the border between the region printed with the ceramic ink and the region without the ceramic ink, Chinese Patent Application No. 201280018141.5, Chinese Patent Application No. 201380040121.2, and United States Patent No. 20110052886A1 disclose a polyvinyl butyral (PVB) printing technology, where a black pigment for shielding is printed on PVB for a laminated glass to replace the ceramic ink printed on the glass substrate, thereby eliminating the temperature gradient formed between different parts of the glass substrate due to the ceramic ink. In addition, Chinese Patent Application No. 201880072438.7 and Chinese Patent Application No. 201880072380.6 disclose a laminated glass, which is formed by combining a plastic intermediate adhesive layer with a substantially opaque thin plastic or a thin film that is printed with a shield, thereby replacing the ceramic ink to play a shielding role. Moreover, Chinese Patent Application No. 201980000818.4 discloses a laminated glass panel. The laminated glass panel includes an opaque decoration formed by laminating a first decoration and a second decoration. The first decoration is on an intermediate adhesive layer, the second decoration is on a surface 2, a surface 3, or a surface 4 of the laminated glass panel, and the second decoration defines a free region (without glaze) that has a size smaller than a size of the first decoration. During assembly of the laminated glass panel, the first decoration is laminated on the second decoration, the first decoration may be formed on the intermediate adhesive layer through screen printing or may be formed by inserting a printing film made from polyethylene terephthalate (PET) or a colored intermediate adhesive film made from PVB into the intermediate adhesive layer. According to these technologies, a shield is printed on a surface of a PVB product, or another opaque film is spliced with the surface of the PVB product to serve as a shield, but accordingly, bubbles and delay bubbles are prone to occur during subsequent vehicle glass production. The shield is also easy to be affected by a vehicle glass production process, and thus, a processing quality is unstable, processing realization is complex, and blur, difficulty in controlling position accuracy, optical problems, etc., are prone to occur at a boundary between the shield and the glass substrate.

SUMMARY

A windshield for a vehicle and a method for manufacturing the windshield are provided in the disclosure to solve technical problems in the related art, that the windshield for the vehicle is prone to bubbles and delay bubbles, a processing quality is unstable, and blur, difficulty in controlling position accuracy, optical defects, etc., are prone to occur at a boundary.

The following technical solution is adopted in the disclosure to solve the technical problem. A windshield for a vehicle is provided. The windshield includes an outer glass panel, an inner glass panel, and an intermediate adhesive layer. The outer glass panel has a first surface toward an outside of the vehicle and a second surface toward an inside of the vehicle, the inner glass panel has a third surface toward the outside of the vehicle and a fourth surface toward the inside of the vehicle, and the second surface is bonded with the third surface via the intermediate adhesive layer. At least one of the outer glass panel or the inner glass panel is a bent glass panel that is formed by subjecting a flat glass panel to high-temperature heat treatment of at least 560° C. and bending process. The windshield further includes an opaque masking layer, where the opaque masking layer includes a dark ceramic-ink layer and an ultraviolet-drying ink layer. The dark ceramic-ink layer is disposed on at least one of the second surface or the fourth surface, and the ultraviolet-drying ink layer is disposed on at least one of the second surface, the third surface, or the fourth surface. The dark ceramic-ink layer has a first no-ink region, where the ultraviolet-drying ink layer is located in the first no-ink region, and the ultraviolet-drying ink layer has a light transmitting region. The light transmitting region has a diopter less than or equal to 200 milli-diopter (mdpt).

Preferably, the windshield includes at least one image acquisition device that is disposed at a side of the windshield inside the vehicle, where the image acquisition device is configured to perform image acquisition through the light transmitting region.

Preferably, the light transmitting region is larger than a region of a field of view of the windshield in a field of view of the image acquisition device in outline by 1 mm to 5 mm.

Preferably, the dark ceramic-ink layer is formed by being disposed on the flat glass panel and subjected to high-temperature heat treatment of at least 560° C. and bending process, and the ultraviolet-drying ink layer is formed on the bent glass panel that is formed through high-temperature heat treatment of at least 560° C. and bending process or on another flat glass panel without being subjected to high-temperature heat treatment of at least 560° C. and bending process.

Preferably, the first no-ink region has a first boundary, the ultraviolet-drying ink layer has a second boundary, the light transmitting region has a third boundary, the second boundary is larger than or equal to the first boundary, and a distance between the second boundary and the third boundary is greater than or equal to 5 mm.

Preferably, the distance between the second boundary and the third boundary ranges from 10 mm to 80 mm.

Preferably, the windshield includes a dark ceramic-ink region at a periphery of the windshield, where the dark ceramic-ink region is coated with black ceramic-ink or brown ceramic-ink.

Preferably, the dark ceramic-ink layer includes an organic solvent and an inorganic powder, a mass percent of the inorganic powder in the dark ceramic-ink layer ranges from 70% to 85%, and the inorganic powder includes a glass glaze, a pigment, and an additive, where the glass glaze has an average particle-size ranging from 5 μm to 10 μm.

Preferably, the ultraviolet-drying ink layer is formed through ultraviolet curing at a temperature lower than or equal to 200° C.

Preferably, the ultraviolet-drying ink layer includes an ultraviolet-curable resin, a diluted acrylate monomer, a pigment, a photoinitiator, and an additive.

Preferably, a thickness of the dark ceramic-ink layer is larger than 15 μm and a thickness of the ultraviolet-drying ink layer is larger than 15 μm, and a difference between the thickness of the dark ceramic-ink layer and the thickness of the ultraviolet-drying ink layer is less than or equal to 1 μm.

Preferably, Lab values of the dark ceramic-ink layer satisfy $4.5 < L1 < 7.2$, $-2.3 < a1 < 0.85$, $-1.5 < b1 < 1.8$, a total color difference $\Delta E$ between the ultraviolet-drying ink layer and the dark ceramic-ink layer satisfies $\Delta E < 1$, the total color difference $\Delta E$ is calculated according to the following formula:

$$\Delta E = \sqrt{(L2-L1)^2 + (a2-a1)^2 + (b2-b1)^2},$$

where L2, a2, and b2 are Lab values of the ultraviolet-drying ink layer.

Preferably, the windshield further includes a transparent conductive film on at least one of the second surface, the third surface, or the fourth surface, where the transparent conductive film defines a film-free window that corresponds to the light transmitting region, and the film-free window is formed by at least partially removing the transparent conductive film.

Preferably, a blackness value of the dark ceramic-ink layer is equal to 1, a blackness value of the ultraviolet-drying ink layer is equal to 1, a thickness of the dark ceramic-ink layer ranges from 18 μm to 25 μm, and a thickness of the ultraviolet-drying ink layer ranges from 18 μm to 25 μm.

Preferably, a visible light transmittance of the light transmitting region is greater than or equal to 70%, and a haze of the light transmitting region is less than or equal to 5%.

Preferably, a visible light transmittance of the dark ceramic-ink layer is less than or equal to 1.5%, a visible light transmittance of the ultraviolet-drying ink layer is less than or equal to 1.5%, an ultraviolet transmittance of the dark ceramic-ink layer is less than or equal to 0.05%, and an ultraviolet transmittance of the ultraviolet-drying ink layer is less than or equal to 0.05%.

Preferably, a method for manufacturing the windshield is further provided in the disclosure, and begins with operations at block 1.

At block 1, a first flat glass panel is prepared, and the dark ceramic-ink layer is printed on the first flat glass panel, where a thickness of the dark ceramic-ink layer is larger than 15 μm, and the dark ceramic-ink layer has a first no-ink region.

At block 2, a first bent glass panel with the dark ceramic-ink layer is obtained by subjecting the first flat glass panel printed with the dark ceramic-ink layer to high-temperature heat treatment of at least 560° C. and bending process.

At block 3, a second flat glass panel that has been chemically tempered is prepared or a second bent glass panel that has been processed through high-temperature heat treatment of at least 560° C. and bending process is prepared.

At block 4, the ultraviolet-drying ink layer is printed in one of the first no-ink region of the first bent glass panel, a region on the second flat glass panel corresponding to the first no-ink region, or a region on the second bent glass panel corresponding to the first no-ink region, where a thickness of the ultraviolet-drying ink layer is larger than 15 μm, a difference between the thickness of the dark ceramic-ink layer and the thickness of the ultraviolet-drying ink layer is less than or equal to 1 μm, a light transmitting region is disposed in the ultraviolet-drying ink layer, where the ultraviolet-drying ink layer is formed through ultraviolet curing at a temperature lower than or equal to 200° C.

At block 5, the windshield is obtained by combining the first bent glass panel and the second flat glass panel through at least one intermediate adhesive layer or by combining the first bent glass panel and the second bent glass panel through at least one intermediate adhesive layer.

Preferably, the method further includes the following at block 1. The dark ceramic-ink layer is pre-sintered on the first flat glass panel at a temperature greater than or equal to 500° C. to pre-cure the dark ceramic-ink layer.

Preferably, at block 3, the dark ceramic-ink layer is disposed on at least one of surfaces of the second bent glass panel.

Preferably, at block 3, a thickness of the second flat glass panel is smaller than or equal to 1.1 mm, and a thickness difference between the first bent glass panel and the second flat glass panel is greater than or equal to 0.7 mm.

The disclosure has following beneficial effects by adopting the above technical solution. According to the windshield for a vehicle and the method for manufacturing the windshield, it can be ensured that the light transmitting region is not affected by the optical distortion or light distortion occurred around the first boundary that are caused by the higher temperature of the dark ceramic-ink layer, and optical quality of the light transmitting region is ensured, so that the diopter of the light transmitting region is less than or equal to 200 mdpt, 150 mdpt, even 100 mdpt or 75 mdpt, and thus images collected by the image acquisition device have higher quality and recognizablility, and driving safety is improved.

DETAILED DESCRIPTION

The disclosure is further elaborated hereinafter in conjunction with the accompanying drawings.

Figure 1:
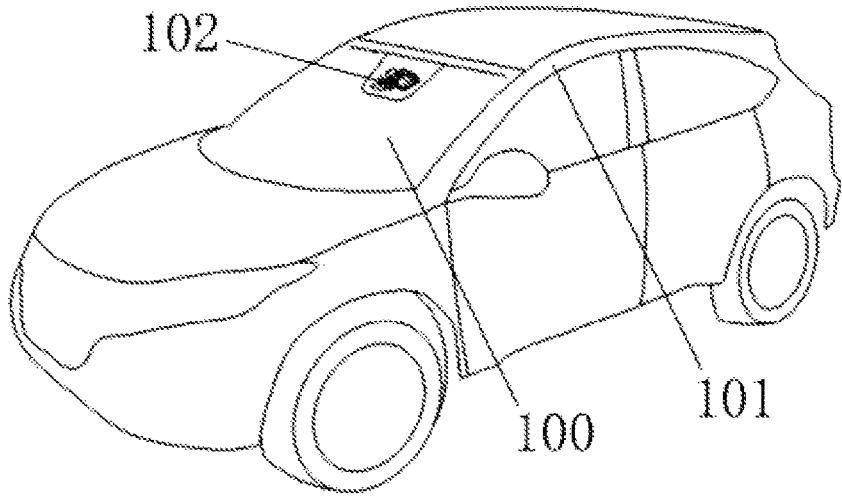
FIG. 1 is a schematic diagram illustrating a windshield for a vehicle mounted on the vehicle according to the disclosure.

As illustrated in FIG. 1, a windshield 100 for a vehicle provided in the disclosure is mounted at an opening of a body 101 of the vehicle. At least one image acquisition device 102 is mounted at an upper part of a side of the windshield inside the vehicle. Light can enter the image acquisition device 102 through the windshield 100, and thus the image acquisition device 102 can shoot an image or a video of a scene outside the vehicle. The image acquisition device 102 is used to record a driving environment in front of the vehicle, or to analyze and assist in changing driving behavior.

In the disclosure, the image acquisition device 102 is mainly a device that acquires images using optical principles such as visible-light imaging and/or infrared imaging. For example, the image acquisition device 102 may be a camera or a camcorder, etc., and can be mounted at a vehicle to achieve functions, such as lane departure warning (LDW), forward collision warning (FCW), traffic sign recognition (TSR), lane keeping assist (LKA), pedestrian collision warning (PCW), and night vision system (NVS).

Figure 2:
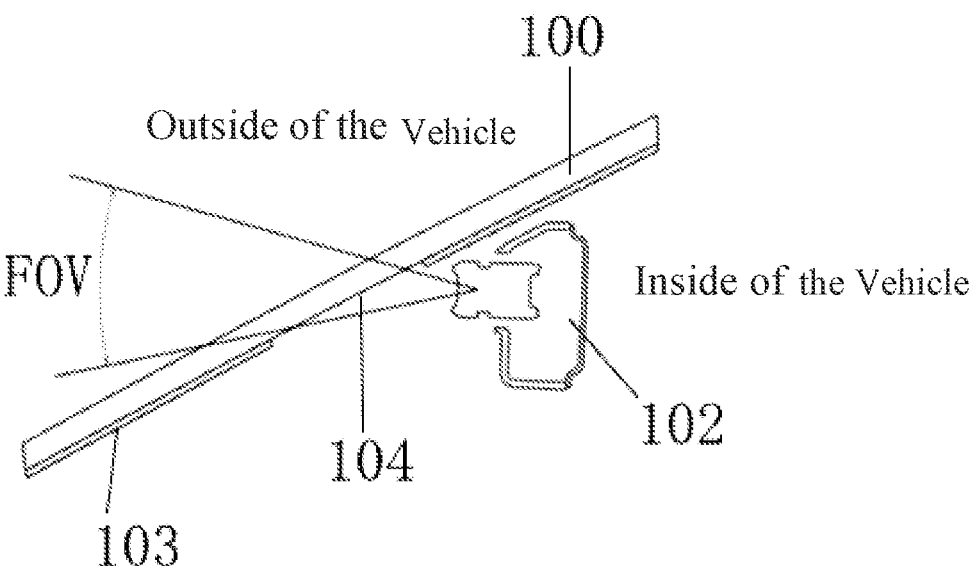
FIG. 2 is a schematic structural diagram illustrating an image acquisition device mounted at an inner side of a windshield for a vehicle according to the disclosure.

Generally, considering vehicle appearance and arrangements of parts, for example, sensors such as a light sensor, a rain sensor, and a humidity sensor being integrated at an upper central position of the windshield 100, the image acquisition device 102 can be directly fixed at the upper central position, or can be fixed at a roof of the vehicle to face upper central position through a support. In order to achieve a good appearance both outside and inside the vehicle, a cover plate can be used to shield the above parts from being seen at an inside of the vehicle, and an opaque masking layer can be used to shield the above parts from being seen an outside of the vehicle. As illustrated in FIG. 2, an opaque masking layer 103 is disposed on at least one surface of the windshield 100. Since the image acquisition device 102 needs to collect images through the windshield 100, a light transmitting region of a certain size needs to be provided in front of the image acquisition device 102. According to a region of the windshield 100 that falls in a field of view (FOV) of the image acquisition device 102, the opaque masking layer 103 defines a light transmitting region 104. The light transmitting region 104 is surrounded by the opaque masking layer 103, and is not covered by the opaque masking layer 103, and the image acquisition device 102 is configured to collect images through the light transmitting region 104. Generally, the light transmitting region 104 is slightly larger than the region of the windshield 100 that falls in the field of view of the image acquisition device 102, which can avoid an insufficient size of the field of view caused by an insufficient area of the light transmitting region 104, and can also avoid poor image quality caused by that excessive stray light from the outside of the vehicle enters the image acquisition device 102 due to an excessively large area of the light transmitting region 104. Preferably, the light transmitting region 104 is larger than the region of the windshield in the field of view of the image acquisition device 102 in outline by 1 mm to 5 mm.

Figure 3:
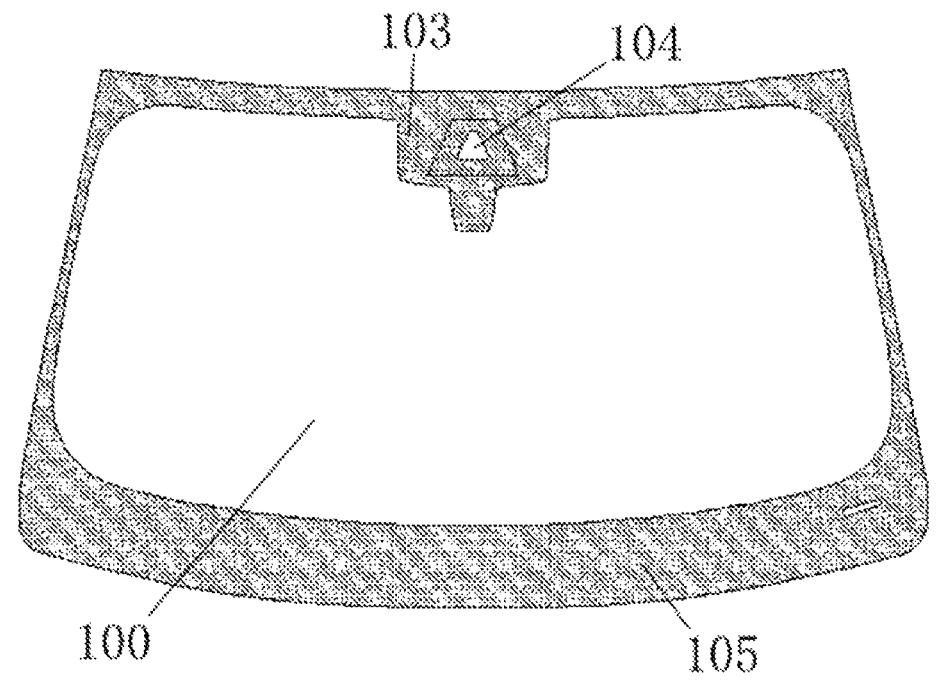
FIG. 3 is a schematic top view of a windshield for a vehicle according to the disclosure.

As illustrated in FIG. 3, the windshield 100 is disposed with a dark ceramic-ink region 105 at a periphery of the windshield 100. The dark ceramic-ink region 105 is used to shield parts inside the vehicle, and thus harmonious color of the periphery of the windshield 100 can be ensured to improve peripheral appearance, and solar radiation can also be blocked to avoid aging of the parts inside the vehicle to improve the stability and prolong service life of the product. The dark ceramic-ink region 105 is preferably coated with black ceramic ink or brown ceramic-ink, which can be formed by means of screen printing, ink-jet printing, etc. A thickness of the dark ceramic-ink region 105 is of micron scale, for example, ranges from 5 µm to 40 µm.

Figure 4:
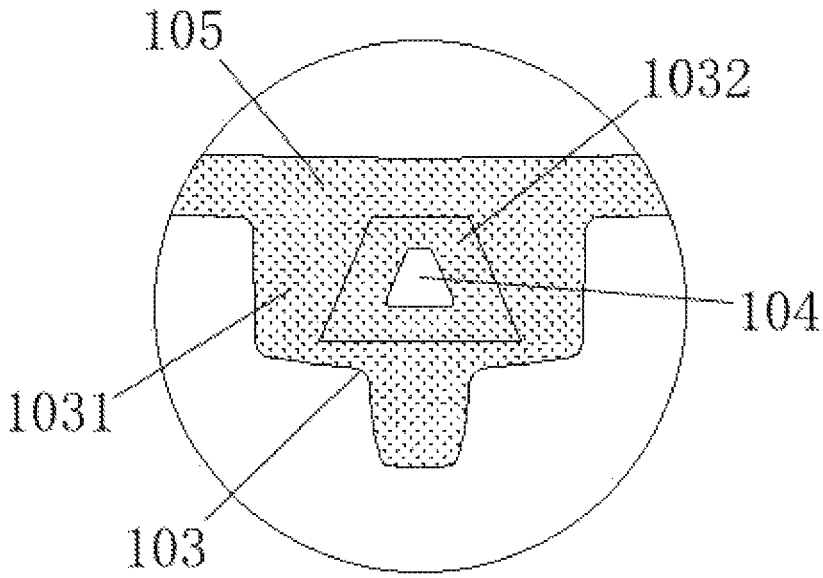
FIG. 4 is an enlarged schematic view of an opaque masking layer according to the disclosure.

As illustrated in FIG. 3 and FIG. 4, the opaque masking layer 103 extends from an edge of the windshield 100 toward a center of the windshield 100. The opaque masking layer 103 includes a dark ceramic-ink layer 1031 and an ultraviolet-drying ink layer 1032. Preferably, the dark ceramic-ink layer 1031 is made from the same material as and through the same process as the dark ceramic-ink region 105, and the dark ceramic-ink layer 1031 and the dark ceramic-ink region 105 are simultaneously formed through the same printing process. The ultraviolet-drying ink layer 1032 is formed inside the dark ceramic-ink layer 1031 and defines the light transmitting region 104. The periphery of the light transmitting region 104 is surrounded by the ultraviolet-drying ink layer 1032.

The dark ceramic-ink layer 1031 can be formed on a surface of a flat glass panel through planographic printing, etc., and then is subjected to high-temperature heat treatment of at least 560° C. and bending process together with the flat glass panel, so that the dark ceramic-ink layer 1031 is sintered and formed on a surface of a bent glass panel. The dark ceramic-ink layer 1031 usually includes an organic solvent and an inorganic power, and a mass percent of the inorganic powder in the dark ceramic-ink layer ranges from 70% to 85%. The inorganic powder mainly includes a glass glaze, a pigment, and an additive. The glass glaze has an average particle-size ranging from 5 µm to 10 µm and main components of bismuth borosilicate, zinc borosilicate, etc., and is used to determine a sintering temperature range, chemical resistance, and the like of the dark ceramic-ink layer 1031. Main components of the pigment include iron oxide, copper oxide, cobalt oxide, nickel oxide, and manganese oxide, etc., and the pigment plays a role in shielding and providing color (preferably, black color).

The ultraviolet-drying ink layer 1032 can be formed, by processes such as curved-surface printing, on a surface of the bent glass panel that is formed through high-temperature heat treatment of at least 560° C. and bending process, and then is cured on the surface of the bent glass panel via ultraviolet at a temperature lower than or equal to 200° C. The ultraviolet-drying ink (also known as ultraviolet ink) layer 1032 mainly includes an ultraviolet-curable resin, a diluted acrylate monomer, a pigment, a photoinitiator, and an additive, etc. The ultraviolet-curable resin is the main component of the ultraviolet-drying ink layer 1032, is used to determine hardness, rub resistance, adhesion, light resistance, chemical resistance and water resistance of the ultraviolet-drying ink layer 1032, and is generally a polymeric prepolymer, such as acrylic resin. The diluted acrylate monomer serves as an active diluent to adjust viscosity, curing rate and post-curing performance of the ultraviolet-drying ink layer 1032. Main components of the pigment includes iron oxide, copper oxide, cobalt oxide, nickel oxide, manganese oxide, etc., and the pigment plays a role in shielding and providing color (preferably, black color).

The photoinitiator is used to absorb radiation energy in the range of 350 nm to 400 nm and produce an active intermediate with a polymerization ability of an initiator, which is helpful to wet the ultraviolet-drying ink layer 1032 and improve the levelling property.

Figures 5, 6:
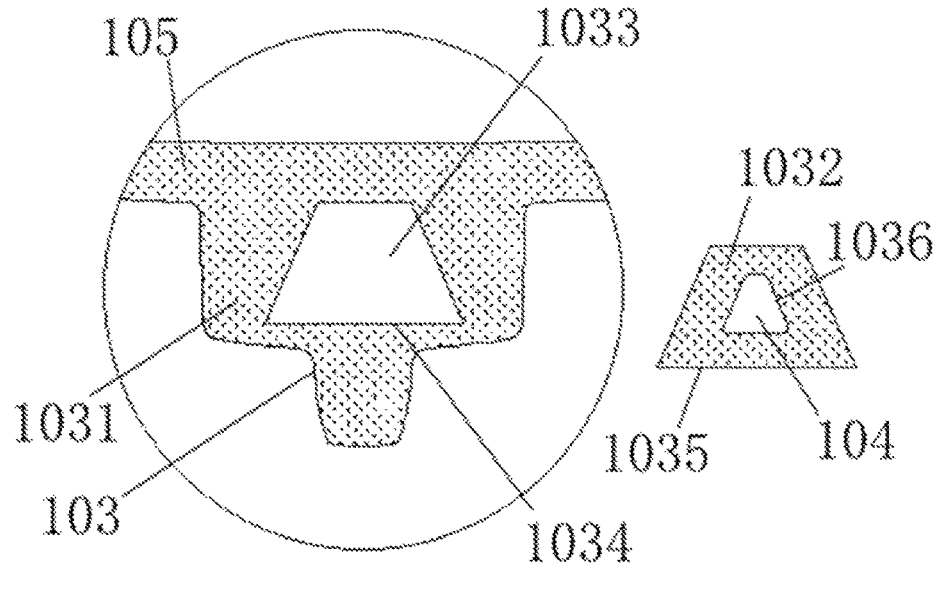
FIG. 5 is a schematic structural view of a dark ceramic-ink layer and an ultraviolet-drying ink layer according to the disclosure.
FIG. 6 is a schematic structural diagram illustrating that a second boundary is larger than a first boundary according to the disclosure.

As illustrated in FIG. 5, the dark ceramic-ink layer 1031 has a first no-ink region 1033, and the first no-ink region 1033 has a first boundary 1034. The ultraviolet-drying ink layer 1032 is located in the first no-ink region 1033, and the ultraviolet-drying ink layer 1032 has the light transmitting region 104. The ultraviolet-drying ink layer 1032 has a second boundary 1035, the light transmitting region 104 has a third boundary 1036, the second boundary 1035 is larger than or equal to the first boundary 1034, and a distance between the second boundary and the third boundary is larger than or equal to 5 mm. First, the dark ceramic-ink layer 1031 having the first no-ink region 1033 is formed on a surface of the flat glass panel through processes such as planar-surface printing. Second, the ultraviolet-drying ink layer 1032 having the light transmitting region 104 is formed, through processes such as curved-surface printing, on the surface of the bent glass panel that is formed through high-temperature heat treatment of at least 560° C. and bending process. In this way, it can be ensured that the light transmitting region 104 is not affected by the optical distortion or light distortion occurred around the first boundary 1034 that are caused by the higher temperature of the dark ceramic-ink layer 1031, and thus the optical quality of the light transmitting region 104 is ensured, so that the diopter of the light transmitting region 104 is less than or equal to 200 mdpt, 150 mdpt, even less than or equal to 100 mdpt or 75 mdpt, and thus images collected by the image acquisition device 102 have higher quality and recognizablility, and driving safety is improved. Preferably, a distance between the second boundary 1035 and the third boundary 1036 ranges from 10 mm to 80 mm, and for example, is equal to 30 mm.

As illustrated in FIG. 5, the dark ceramic-ink layer 1031 has the first no-ink region 1033, and the ultraviolet-drying ink layer 1032 has the light transmitting region 104. The number of the light transmitting region 104 can be determined according to the number of the image acquisition device 102 mounted in the disclosure. For example, there are at least two image acquisition devices 102, the at least two image acquisition devices 102 can collect images through the same light transmitting region 104, or each of the at least two image acquisition devices 102 can collect images through a corresponding one of light transmitting regions 104. Specifically, the dark ceramic-ink layer 1031 has one first no-ink region 1033, and the ultraviolet-drying ink layer 1032 has at least two light transmitting regions 104; alternatively, the dark ceramic-ink layer 1031 has at least two first no-ink regions 1033, and each ultraviolet-drying ink layer 1032 has one light transmitting region 104.

The second boundary 1035 overlaps the first boundary 1034, and the ultraviolet-drying ink layer 1032 covers the first no-ink region 1033. As illustrated in FIG. 6, the second boundary 1035 is larger than the first boundary 1034, i.e., the second boundary 1035 includes a part MN that extends to the dark ceramic-ink layer 1031, and the first boundary 1034 includes a part NO that extends to the ultraviolet-drying ink layer 1032. The ultraviolet-drying ink layer 1032 covers the first no-ink region 1033, and the ultraviolet-drying ink layer 1032 and the dark ceramic-ink layer 1031 cooperatively form an ink overlap boundary MO.

Figure 7:
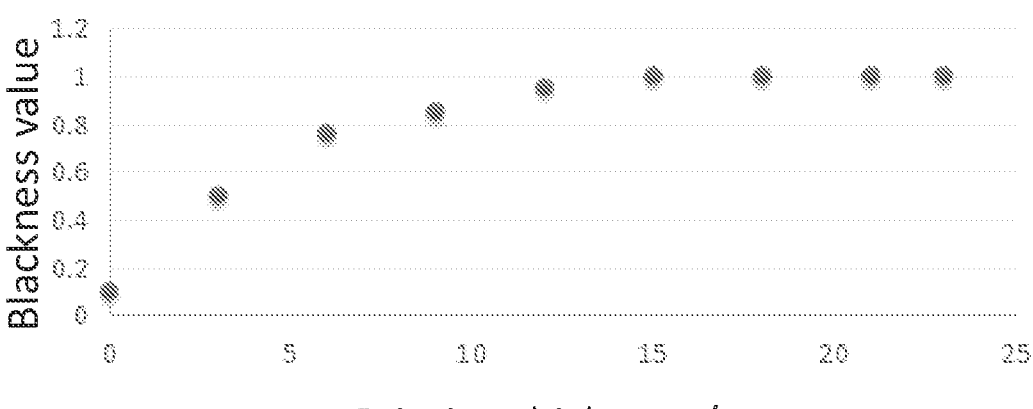
FIG. 7 is a schematic diagram illustrating a relation between a printing thickness and a blackness value of a dark ceramic-ink layer and an ultraviolet-drying ink layer according to the disclosure.

In order to ensure an overall appearance, there is no color difference that can be recognized by human eyes between the dark ceramic-ink layer 1031 and the ultraviolet-drying ink layer 1032. As illustrated in FIG. 7, preferably, a thickness of the dark ceramic-ink layer 1031 is larger than 15 μm and a thickness of the ultraviolet-drying ink layer 1032 is larger than 15 μm. A blackness value of the dark ceramic-ink layer 1031 is about 1, and a blackness value of the ultraviolet-drying ink layer 1032 is about 1. The blackness value of the dark ceramic-ink layer 1031 can be equal to a blackness value of the ultraviolet-drying ink layer 1032. The blackness value defines a degree of black color of the dark ceramic-ink layer 1031 and the ultraviolet-drying ink layer 1032. The blackness value is about 1 means that the dark ceramic-ink layer 1031 and the ultraviolet-drying ink layer 1032 can absorb at least 95% of visible light. For example, the blackness value is about 1 means that the dark ceramic-ink layer 1031 and the ultraviolet-drying ink layer 1032 can absorb 96%, 98%, 99%, 99.5%, or 99.95% of visible light. A difference between the thickness of the dark ceramic-ink layer 1031 and the thickness of the ultraviolet-drying ink layer 1032 is less than or equal to 1 μm. Preferably, the thickness of the dark ceramic-ink layer 1031 ranges from 18 μm to 25 μm, and the thickness of the ultraviolet-drying ink layer 1032 ranges from 18 μm to 25 μm. In the disclosure, Lab values of the dark ceramic-ink layer 1031 satisfy $4.5 < L1 < 7.2$, $-2.3 < a1 < 0.85$, $-1.5 < b1 < 1.8$, a total color difference $\Delta E$ between the ultraviolet-drying ink layer 1032 and the dark ceramic-ink layer 1031 satisfies $\Delta E < 1$, and the total color difference $\Delta E$ is calculated according to the following formula:

$$\Delta E = \sqrt{(L2-L1)^2 + (a2-a1)^2 + (b2-b1)^2}.$$

Figure 8:
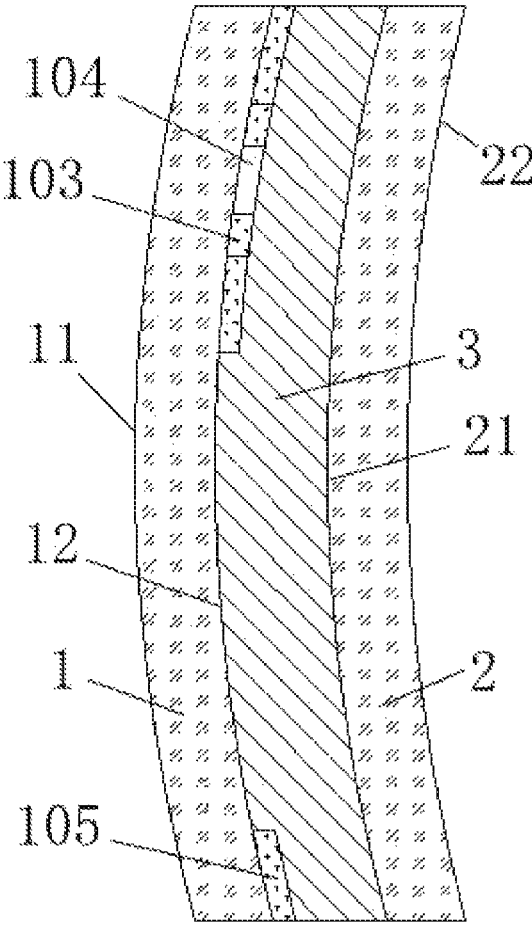
FIG. 8 is a schematic cross-sectional view of a windshield for a vehicle in an implementation according to the disclosure.
Figure 9:
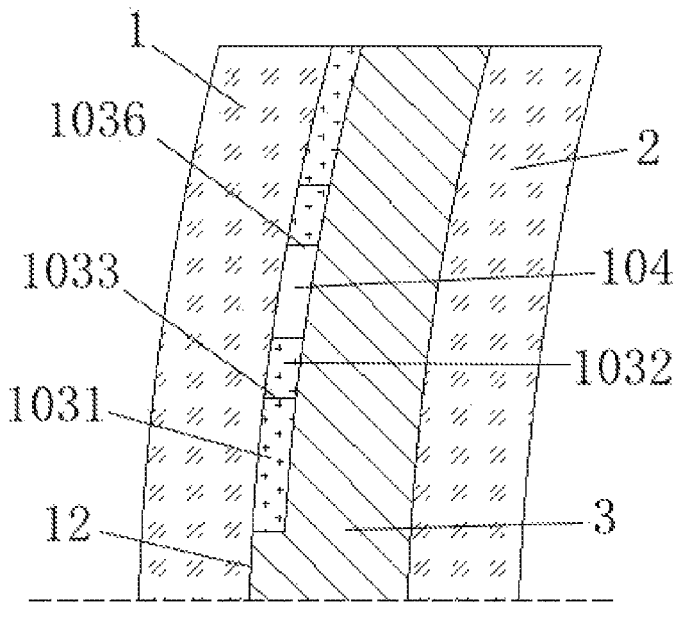
FIG. 9 is a partially enlarged view of FIG. 8.

As illustrated in FIG. 8 and FIG. 9, the windshield 100 provided in the disclosure includes an outer glass panel 1, an inner glass panel 2, and an intermediate adhesive layer 3. The outer glass panel 1 has a first surface 11 toward an outside of the vehicle and a second surface 12 toward an inside of the vehicle, the inner glass panel 2 has a third surface 21 toward the outside of the vehicle and a fourth surface 22 toward the inside of the vehicle, and the second surface 12 is bonded with the third surface 21 via the intermediate adhesive layer 3. The dark ceramic-ink layer 1031 is disposed on at least one of the second surface 12 or the fourth surface 22, and the ultraviolet-drying ink layer 1032 is disposed on at least one of the second surface 12, the third surface 21, or the fourth surface 22. The dark ceramic-ink layer 1031 and the ultraviolet-drying ink layer 1032 cooperatively form the opaque masking layer 103. At least one of the outer glass panel 1 or the inner glass panel 2 is a bent glass panel that is formed by subjecting a flat glass panel to high-temperature heat treatment of at least 560° C. and bending process. The dark ceramic-ink layer 1031 is disposed on the flat glass panel, and the ultraviolet-drying ink layer 1032 is disposed on the outer glass panel 1 or the inner glass panel 2. The high-temperature heat treatment of at least 560° C. and the bending process are producing processes of vehicle glass, such as hot bending, tempering, or other bending process.

Figure 10:
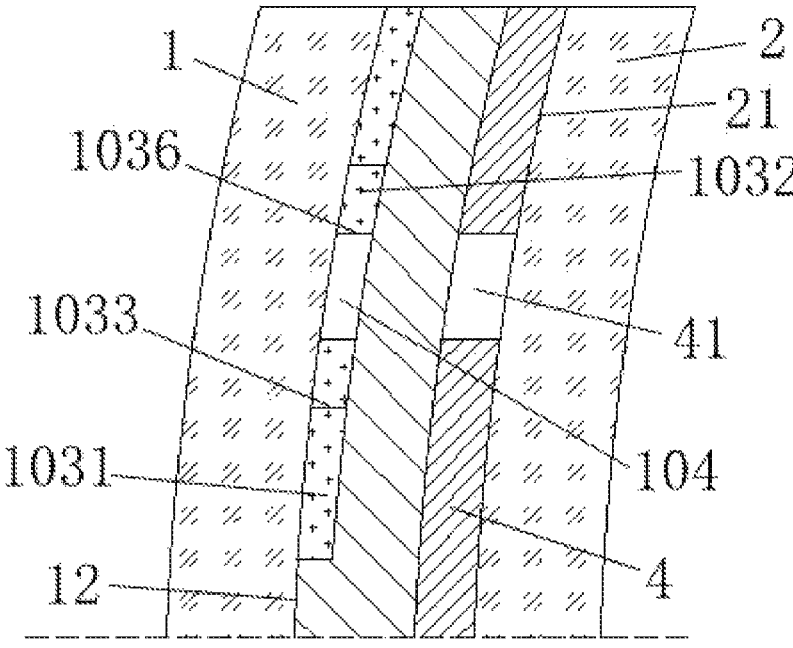
FIG. 10 is a partial schematic cross-sectional view of a windshield for a vehicle in an implementation according to the disclosure.
Figure 11:
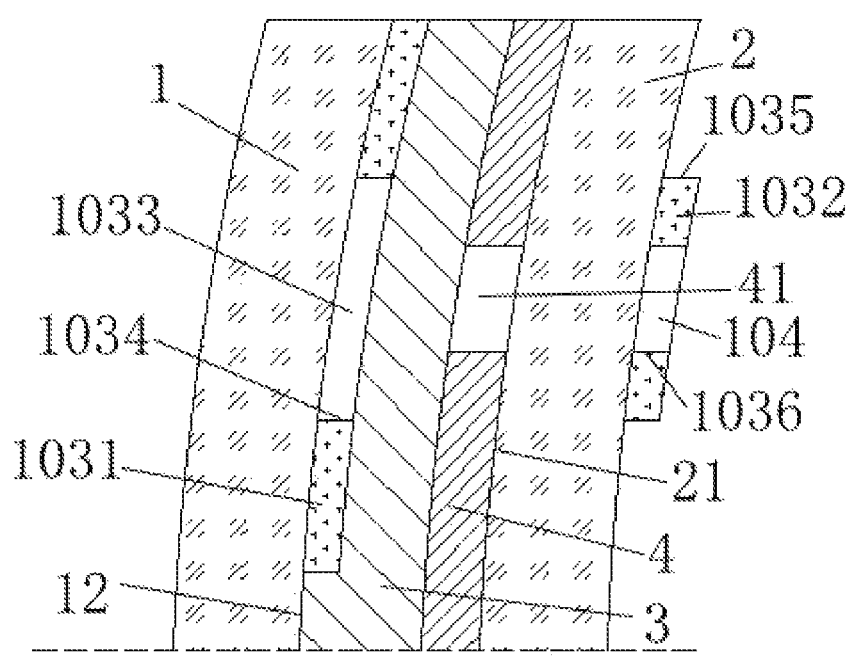
FIG. 11 is a partial schematic cross-sectional view of a windshield for a vehicle in an implementation according to the disclosure.
Figure 12:
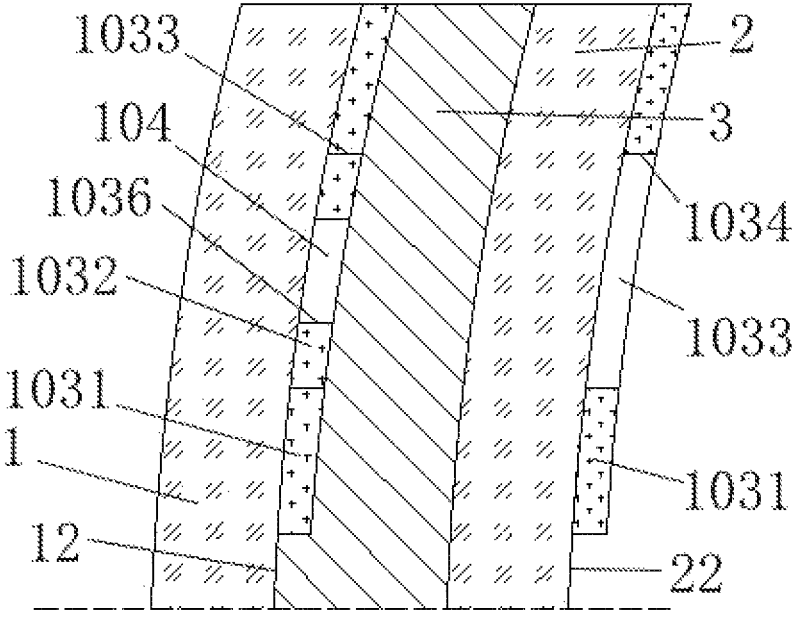
FIG. 12 is a partial schematic cross-sectional view of a windshield for a vehicle in an implementation according to the disclosure.

As illustrated in FIG. 9, the dark ceramic-ink layer 1031 and the ultraviolet-drying ink layer 1032 are disposed on the same surface, i.e., the second surface 12. As illustrated in FIG. 10, the dark ceramic-ink layer 1031 and the ultraviolet-drying ink layer 1032 are disposed on the same surface, i.e., the second surface 12. A transparent conductive film 4 is further disposed on the third surface 21. The transparent conductive film 4 defines a film-free window 41 that corresponds to the light transmitting region 104, and the film-free window 41 is formed by at least partially removing the transparent conductive film 4, facilitating transmission of electromagnetic wave signals and ensuring spectral performance of the light transmitting region 104. Alternatively, the transparent conductive film 4 may be disposed on the second surface 12 or the fourth surface 22. The transparent conductive film 4 is used to reflect infrared ray and/or heat the windshield 100. As illustrated in FIG. 11, the dark ceramic-ink layer 1031 and the ultraviolet-drying ink layer 1032 are disposed on different surfaces. The dark ceramic-ink layer 1031 is disposed on the second surface 12, and the ultraviolet-drying ink layer 1032 is disposed on the fourth surface 22. The transparent conductive film 4 is disposed on the third surface 21. The dark ceramic-ink layer 1031 has the first no-ink region 1033, and the first no-ink region 1033 has a first boundary 1034. The ultraviolet-drying ink layer 1032 has the light transmitting region 104 and a second boundary 1035, and the light transmitting region 104 has a third boundary 1036. A projection of the ultraviolet-drying ink layer 1032 in a thickness direction thereof falls into the first no-ink region 1033. The transparent conductive film 4 defines a film-free window 41 that corresponds to the light transmitting region 104. As illustrated in FIG. 12, two dark ceramic-ink layers 1031 are provided. One dark ceramic-ink layer 1031 and the ultraviolet-drying ink layer 1032 are disposed on the same surface, i.e., the second surface 12. The other dark ceramic-ink layer 1031 is disposed on the fourth surface 22. The other dark ceramic-ink layer 1031 on the fourth surface 22 and the one dark ceramic-ink layer 1031 on the second surface 12 are the same in shape.

The transparent conductive film 4 can be directly deposited onto the second surface 12, the third surface 21, or the fourth surface 22 by chemical vapor deposition (CVD) or physical vapor deposition (PVD), for example, though magnetron sputtering deposition. In addition, preferably, the transparent conductive film 4 can withstand high-temperature heat treatment, for example, a bending process such as hot bending, tempering, etc. Specifically, the transparent conductive film 4 may include a metal layer, a metal alloy layer, or a metal oxide layer. The metal layer may be made from gold (Au), silver (Ag), copper (Cu), aluminum (Al), or molybdenum (Mo). The metal alloy layer may be made from silver alloy. The metal oxide layer may be made from indium tin oxide (ITO), fluorine-doped tin dioxide (FTO), aluminum-doped zinc dioxide (AZO), antimony-doped tin oxide (ATO), etc. For example, when the transparent conductive film 4 includes the silver layer or the silver alloy layer, the silver layer or the silver alloy layer is located between at least two medium layers, and the at least two medium layers include at least one of zinc oxide, tin oxide, indium oxide, titanium oxide, silicon oxide, aluminum oxide, silicon nitride, silicon carbide, aluminum nitride, or a titanium metal layer.

The intermediate adhesive layer 3 in the disclosure is used to bond the outer glass panel 1 with the inner glass panel 2. For example, the intermediate adhesive layer 3 may be made from polycarbonate (PC), polyvinyl chloride (PVC), polyvinyl butyral (PVB), ethylene vinyl acetate (EVA), polyacrylate (PA), polymethylmethacrylate (PMMA), or polyurethane (PUR), etc. The intermediate bonding layer 3 may also have other functions. For example, the intermediate bonding layer 3 may be provided with at least one colored region that serves as a shadow band to reduce interference of sunlight on human eyes. Alternatively, the intermediate bonding layer 3 may have an infrared absorbent to achieve sunscreen or heat insulation function. For another example, the intermediate bonding layer 3 may also include at least two layers, one of which has a plasticizer of a higher content to make the intermediate bonding layer 3 have a sound insulation function, or one of which is in a shape of wedge to make the intermediate bonding layer 3 have a head-up display (HUD) function, etc.

A method for manufacturing the windshield is further provided, and begins with operations at block 1.

At block 1, a first flat glass panel is prepared, and the dark ceramic-ink layer 1031 is printed on the first flat glass panel, where the dark ceramic-ink layer 1031 has a first no-ink region 1033, and the first no-ink region 1033 has a first boundary 1034.

Preferably, the dark ceramic-ink layer 1031 on the first flat glass panel is pre-sintered at a temperature of at least 500° C. to pre-cure the dark ceramic-ink layer 1031, avoiding the dark ceramic ink bonding with other glass panels or production equipment, and thus ensuring the printing quality of the dark ceramic-ink layer 1031.

At block 2, a first bent glass panel with the dark ceramic-ink layer 1031 is obtained by subjecting the first flat glass panel printed with the dark ceramic-ink layer 1031 to high-temperature heat treatment of at least 560° C. and bending process.

The sintering process of the dark ceramic-ink layer 1031 is combined with the high-temperature heat treatment and bending forming process of the first bent glass panel, so that the first bent glass panel having the dark ceramic-ink layer 1031 can be obtained in one-step forming according to a production process of vehicle glasses, thereby omitting some process steps.

At block 3, a second flat glass panel that has been chemically tempered or a second bent glass panel that has been processed through high-temperature heat treatment of at least 560° C. and bending process.

Optionally, the dark ceramic-ink layer 1031 is also disposed on at least one surface of the second bent glass panel to improve the overall shielding or enhance the adhesive performance between the accessories and the glass panel.

A thickness of the second flat glass panel is smaller than a thickness of the first bent glass panel. Preferably, the thickness of the second flat glass panel is smaller than or equal to 1.1 mm, and the thickness of the first bent glass panel is larger than the thickness of the second flat glass panel by at least 0.7 mm.

As for the chemical tempering, ions with different ionic radii are exchanged on a surface of a thin glass or an ultra-thin glass, such that a relatively high surface stress is generated on the surface of the thin glass or the ultra-thin glass, accompanied by a certain depth of stress layer, thereby improving a strength of the thin glass or the ultra-thin glass in terms of mechanical properties. Preferably, the second flat glass panel is an alkaline aluminosilicate glass.

At block 4, the ultraviolet-drying ink layer 1032 is printed in one of the first no-ink region 1033 of the first bent glass panel, a region on the second flat glass panel corresponding to the first no-ink region 1033, or a region on the second bent glass panel corresponding to the first no-ink region 1033, where a light transmitting region 104 is disposed in the ultraviolet-drying ink layer 1032, and the ultraviolet-drying ink layer 1032 is formed through ultraviolet curing at a temperature lower than or equal to 200° C.

The ultraviolet-drying ink layer 1032 has a second boundary 1035, the light transmitting region 104 has a third boundary 1036. The second boundary 1035 is larger than or equal to the first boundary 1034, and a distance between the second boundary 1035 and the third boundary 1036 is larger than or equal to 5 mm. The dark ceramic-ink layer 1031 and the ultra-violet-drying ink layer 1032 are located on the same surface. According to implementations of the disclosure, the dark ceramic-ink layer 1031 and the ultraviolet-drying drying ink layer 1032 can also be located on different surfaces.

In order to ensure the quality of the image acquired by the image acquisition device 102, a visible light transmittance of the light transmitting region 104 is greater than or equal to 70%, and a haze of the light transmitting region 104 is less than or equal to 5%, more preferably less than or equal to 1.5%, or even less than or equal to 1%. Correspondingly, a visible light transmittance of the dark ceramic-ink layer 1031 is less than or equal to 1.5%, and a visible light transmittance of the ultraviolet drying ink layer 1032 is less than or equal to 1.5%. An ultraviolet transmittance of the dark ceramic-ink layer 1031 is less than or equal to 0.05%, and an ultraviolet transmittance of the ultraviolet-drying ink layer 1032 is less than or equal to 0.05%.

At block 5, the windshield 100 is obtained by combining the first bent glass panel and the second flat glass panel through at least one intermediate adhesive layer or by combining the first bent glass panel and the second bent glass panel through at least one intermediate adhesive layer 3.

In the disclosure, the first bent glass panel may serve as the outer glass panel 1 of the windshield 100, and the second flat glass panel or the second bent glass panel may serve as the inner glass panel 2 of the windshield 100. The second flat glass panel is preferably bonded with the first bent glass panel through cold forming to obtain the windshield 100.

The windshield for a vehicle and the method for manufacturing the windshield in the disclosure are elaborated above, but the disclosure is not limited to the implementations described above. Any improvements, equivalent modifications, and replacements made according to technical points of the disclosure fall into the protection scope of the disclosure.

What is claimed is:

1. A windshield for a vehicle, comprising an outer glass panel, an inner glass panel, and an intermediate adhesive layer, the outer glass panel having a first surface toward an outside of the vehicle and a second surface toward an inside of the vehicle, the inner glass panel having a third surface toward the outside of the vehicle and a fourth surface toward the inside of the vehicle, the second surface being bonded with the third surface via the intermediate adhesive layer, and at least one of the outer glass panel or the inner glass panel being a bent glass panel that is formed by subjecting a flat glass panel to high-temperature heat treatment of at least 560° C. and bending process, wherein the windshield further comprises an opaque masking layer, wherein the opaque masking layer comprises a dark ceramic-ink layer and an ultraviolet-drying ink layer, wherein the dark ceramic-ink layer is disposed on at least one of the second surface or the fourth surface, the ultraviolet-drying ink layer is disposed on at least one of the second surface, the third surface, or the fourth surface, the dark ceramic-ink layer has a first no-ink region, and wherein the ultraviolet-drying ink layer is located in the first no-ink region, and the ultraviolet-drying ink layer has a light transmitting region, wherein the light transmitting region has a diopter less than or equal to 200 milli-diopter (mdpt), wherein Lab values of the dark ceramic-ink layer satisfy $4.5 < L_1 < 7.2$, $-2.3 < a_1 < 0.85$, $-1.5 < b_1 < 1.8$, a total color difference $\Delta E$ between the ultraviolet-drying ink layer and the dark ceramic-ink layer satisfies ΔE<1, and the total color difference ΔE is calculated according to the following formula:

$$\Delta E = \sqrt{(L2-L1)^2 + (a2-a1)^2 + (b2-b1)^2},$$

wherein L2, a2, and b2 are Lab values of the ultraviolet-drying ink layer.

2. The windshield of claim 1, comprising at least one image acquisition device that is disposed at a side of the windshield inside the vehicle, wherein the image acquisition device is configured to perform image acquisition through the light transmitting region.

3. The windshield of claim 2, wherein the light transmitting region is larger than a region of the windshield in a field of view of the image acquisition device in outline by 1 mm to 5 mm.

4. The windshield of claim 1, wherein the dark ceramic-ink layer is formed by being disposed on the flat glass panel and subjected to high-temperature heat treatment of at least 560° C. and bending process, and the ultraviolet-drying ink layer is formed on the bent glass panel that is formed through high-temperature heat treatment of at least 560° C. and bending process or on another flat glass panel without being subjected to high-temperature heat treatment of at least 560° C. and bending process.

5. The windshield of claim 1, wherein the first no-ink region has a first boundary, the ultraviolet-drying ink layer has a second boundary, the light transmitting region has a third boundary, the second boundary is larger than or equal to the first boundary, and a distance between the second boundary and the third boundary is greater than or equal to 5 mm.

6. The windshield of claim 5, wherein the distance between the second boundary and the third boundary ranges from 10 mm to 80 mm.

7. The windshield of claim 1, comprising a dark ceramic-ink region at a periphery of the windshield, wherein the dark ceramic-ink region is coated with black ceramic-ink or brown ceramic-ink.

8. The windshield of claim 1, wherein the dark ceramic-ink layer is made from an organic solvent and an inorganic powder, a mass percent of the inorganic powder in the dark ceramic-ink layer ranges from 70% to 85%, and the inorganic powder comprises a glass glaze, a pigment, and an additive, wherein the glass glaze has an average particle-size ranging from 5 μm to 10 μm.

9. The windshield of claim 1, wherein the ultraviolet-drying ink layer is formed through ultraviolet curing at a temperature lower than or equal to 200° C.

10. The windshield of claim 1, wherein the ultraviolet-drying ink layer is made from an ultraviolet-curable resin, a diluted acrylate monomer, a pigment, a photoinitiator, and an additive.

11. The windshield of claim 1, wherein a thickness of the dark ceramic-ink layer is larger than 15 μm and a thickness of the ultraviolet-drying ink layer is larger than 15 μm, and a difference between the thickness of the dark ceramic-ink layer and the thickness of the ultraviolet-drying ink layer is less than or equal to 1 μm.

12. The windshield of claim 1, further comprising a transparent conductive film on at least one of the second surface, the third surface, or the fourth surface, wherein the transparent conductive film defines a film-free window that corresponds to the light transmitting region, and the film-free window is formed by at least partially removing the transparent conductive film.

13. The windshield of claim 1, wherein a blackness value of the dark ceramic-ink layer is about 1, a blackness value of the ultraviolet-drying ink layer is about 1, a thickness of the dark ceramic-ink layer ranges from 18 μm to 25 μm, and a thickness of the ultraviolet-drying ink layer ranges from 18 μm to 25 μm.

14. The windshield of claim 1, wherein a visible light transmittance of the light transmitting region is greater than or equal to 70%, and a haze of the light transmitting region is less than or equal to 5%.

15. The windshield of claim 1, wherein a visible light transmittance of the dark ceramic-ink layer is less than or equal to 1.5%, a visible light transmittance of the ultraviolet-drying ink layer is less than or equal to 1.5%, an ultraviolet transmittance of the dark ceramic-ink layer is less than or equal to 0.05%, and an ultraviolet transmittance of the ultraviolet-drying ink layer is less than or equal to 0.05%.

* * * * *